(12) United States Patent
Vougioukas et al.

(10) Patent No.: US 10,395,162 B1
(45) Date of Patent: Aug. 27, 2019

(54) ULTRA-LOW POWER AND COST PURELY ANALOG BACKSCATTER SENSORS WITH EXTENDED RANGE SMARTPHONE/CONSUMER ELECTRONICS FM RECEPTION

(71) Applicants: Georgios Vougioukas, Chania (GR); Aggelos Bletsas, Chania (GR)

(72) Inventors: Georgios Vougioukas, Chania (GR); Aggelos Bletsas, Chania (GR)

( * ) Notice: Subject to any disclaimer, the term of this patent is extended or adjusted under 35 U.S.C. 154(b) by 0 days.

(21) Appl. No.: 15/995,415

(22) Filed: Jun. 1, 2018

Related U.S. Application Data

(60) Provisional application No. 62/514,825, filed on Jun. 3, 2017.

(51) Int. Cl.
*G06K 19/07* (2006.01)
*G06K 19/077* (2006.01)
*H04B 1/10* (2006.01)
*H04B 1/12* (2006.01)

(52) U.S. Cl.
CPC ......... *G06K 19/07773* (2013.01); *H04B 1/10* (2013.01); *H04B 1/12* (2013.01)

(58) Field of Classification Search
CPC . H04B 1/06; H04B 1/086; H04B 1/10; H04B 1/1018; H04B 1/1027; H04B 1/1081; H04B 1/109; H04B 1/12; H04B 1/14; H04B 1/38; H04B 1/59; H04B 17/00; H04B 17/20; H04B 17/24; H01B 1/1009; G06K 19/0716; G06K 19/0717
See application file for complete search history.

(56) References Cited

U.S. PATENT DOCUMENTS

| | | | | |
|---|---|---|---|---|
| 4,075,632 A * | 2/1978 | Baldwin | ............... | A01K 29/005 340/870.01 |
| 9,613,237 B2 * | 4/2017 | Nikunen | ............ | G06K 7/10158 |
| 9,779,342 B2 * | 10/2017 | Nikunen | .................. | G06K 7/10 |
| 2005/0143026 A1 * | 6/2005 | Bellantoni | ........... | H04B 1/0458 455/121 |
| 2009/0023469 A1 * | 1/2009 | Tomioka | ............... | H04W 48/16 455/552.1 |
| 2009/0082691 A1 * | 3/2009 | Denison | ............. | A61B 5/04004 600/544 |
| 2009/0219137 A1 * | 9/2009 | Forster | ................. | G06K 7/0008 340/10.1 |
| 2016/0328637 A1 * | 11/2016 | Viikari | ............... | G06K 19/0717 |

* cited by examiner

*Primary Examiner* — Van T Trieu

(57) ABSTRACT

Ultra-low power and cost, purely analog backscatter sensors, based on capacitive and/or resistive principles, consumer electronics FM reception and extended range.

15 Claims, 7 Drawing Sheets

ULTRA-LOW POWER AND COST PURELY ANALOG BACKSCATTER SENSORS WITH EXTENDED RANGE SMARTPHONE/CONSUMER ELECTRONICS FM RECEPTION

TECHNICAL FIELD

Aspects herein relate generally to ultra-low power and cost wireless sensors. More particularly, aspects herein relate to a backscatter sensor device comprising purely analog capacitive or resistive sensors. The backscatter sensor device requires less than 24 µWatt in continuous operation to perform and transmit measurements that can be received by conventional FM receivers, typically found in smartphones or commodity electronics. The backscatter sensor device offers communication range up to 26 meters outdoors, can accommodate a large variety of capacitive or resistive elements, and is easy to maintain and operate from a non-skilled person. Aspects also relate to a receiver device and method for boosting the communication range of the wireless sensing device.

BACKGROUND OF THE INVENTION

Measuring and wirelessly transmitting temperature, air/environmental humidity, soil moisture or pressure with ultra-low monetary cost (in dollars), as well as ultra-low power cost (in microWatts) is typically required in a variety of emerging applications. For example, batteryless soil moisture and/or air humidity sensing or plant electric potential with a large number of wireless devices is required in agriculture and environmental sensing; wireless and low-cost measurement of tire pressure in automobiles, including cars and bicycles, is another application domain. Large numbers of such wireless sensors require an extensive amount of money to acquire, install, operate and maintain. Moreover, their power consumption in continuous operation may not allow for batteryless operation or may require battery replacements periodically, or may increase cost for energy storage devices, such as supercapacitors.

Conventional wireless sensing devices require interfacing a sensing circuit to an analog-to-digital converter (ADC), followed by a digital communication Marconi radio; the latter is typically controlled by a digital logic chip (DLC) or an embedded microcontroller unit (MCU). Such designs increase monetary (in Euros) and power cost (in Watt) per wireless sensor, while they require a dedicated wireless receiver of the sensed and wirelessly-transmitted information. In the prior art [Bletsas et al 08] scatter radio is disclosed, i.e., communication by means of reflection, for each sensor, equipped with ADC and DLC or MCU, decreasing the overall monetary and energy cost. In [Bletsas et al 12], [Bletsas et al 12b], [Bletsas et al 14] illuminator of sensor and receiver of the scattered (from the sensor) information are distinct units; alternatively, the illuminator can be a broadcasting TV [Smith et al 13] or FM [Smith et al 17] station, with sensor modulating bits with appropriate DLC and scatter radio; in [Bletsas et al 13], [Bletsas et al 13b], [Bletsas et al 14b] analog signals are modulated with scatter radio, where a dedicated continuous wave (CW) carrier device is utilized as the illuminating source and sensed information is received, processed and extracted from a dedicated software-defined radio (SDR) receiver. Thus, prior art has either used analog scatter radio with dedicated illuminators and receivers or digital scatter radio, with sensors equipped with DLC or MCU, requiring also an ADC to interface specific sensors.

Dedicated emitters or receivers for scatter radio increase the overall monetary cost to assembly, operate and maintain scatter radio infrastructure. Scatter radio-based sensors may also suffer from limited communications range. Furthermore, MCU and/or DLC and/or ADC increase complexity and thus, monetary and power cost per wireless sensor.

Therefore, a need exists to improve the design of sensing devices and receivers of sensor signals in order to jointly reduce wireless sensor power consumption and monetary cost, while being able to receive the information several meters away.

The inventors have devised a backscatter sensor device and a receiver device method of sensor signals that improve over the prior art. More specifically, this invention offers a complete, ultra-low power and ultra-low cost analog system, able to measure a physical quantity via a capacitive or resistive sensing element; the invented sensor exploits either dedicated or ambient illuminating sources (FM broadcasting stations) in order to scatter the measured value to a conventional FM radio receiver, including FM radio equipped smartphones. The wireless sensor presented consumes below 24 µW at continuous operation and is build using very low cost, off-the-shelf components. Additionally, a device method in conjunction with commodity electronics FM receiver offers communication ranges in the order of 26 meters outdoor.

SUMMARY OF THE INVENTION

The objective of the present invention is achieved by a backscatter sensor device that implements ultra-low power and cost, purely analog backscatter sensors of capacitive or resistive primitives, which generate signals able to be received by commodity FM receivers, typically found in consumer electronics or smartphones. The backscatter sensor device offers extended communication range in the order of tens of meters, with power consumption (under continuous operation) below 24 µW, using no ADC, DLC or MCU. It can accommodate a large variety of capacitive or resistive elements, it is easy to maintain and operate from a non-skilled person. The objective of the present invention is also achieved by a receiving device and device method, which boosts the communication range of the device.

DETAILED DESCRIPTION OF THE INVENTION

Figure 1:
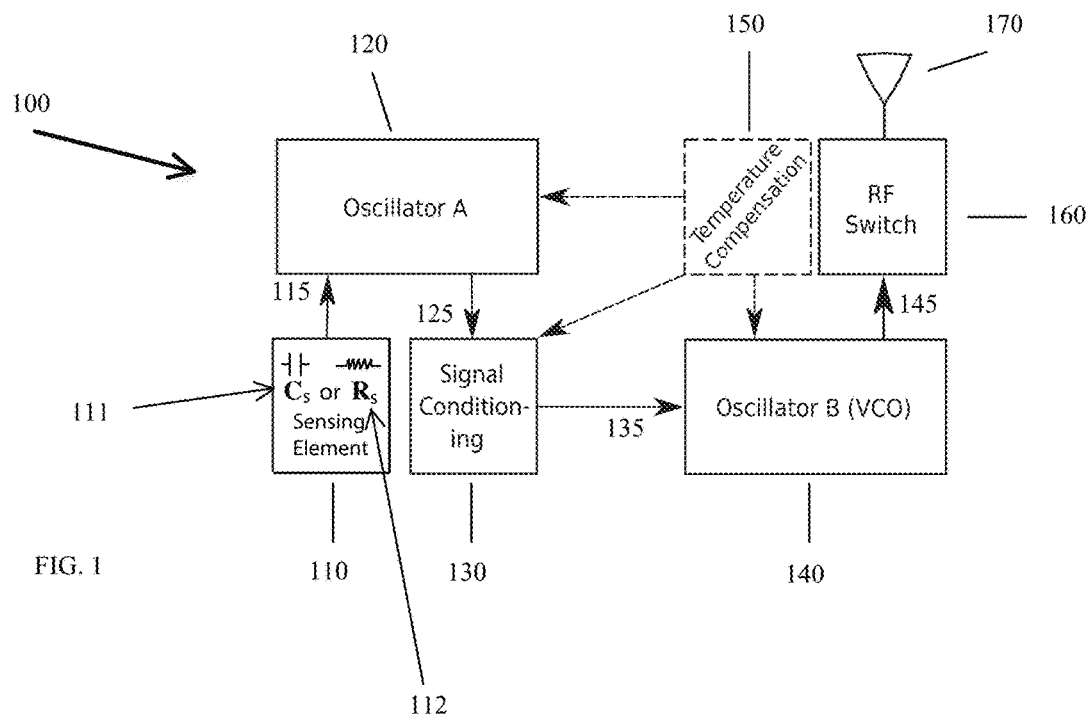
FIG. 1 is a system view of a backscatter sensor device according to an aspect of the present invention.

FIG. 1 depicts a backscatter sensor device 100 according to examples of the invention. Backscatter sensor device 100 may comprise a sensing circuit 110, a first oscillator 120, a signal conditioning circuit 130, a second oscillator 140, a temperature compensation device 150, a Radio Frequency (RF) switch 160 and an antenna 170.

Sensing circuit 110 may be implemented as a sensing element comprising by a single sensing capacitor Cs 111, or a sensing resistor Rs 112, or combinations thereof. Sensing circuit 110 may measure soil moisture or air humidity or pressure or other similar quantities, or combinations thereof. Sensing circuit 110 may be connected to the first oscillator 120. In some examples, sensing circuit 110 may comprise a plurality of sensing elements connected in series, or in parallel or in combinations thereof. In some examples, sensing elements may be of different technologies and/or of different tolerances and/or measure different ranges and/or measure different quantities.

First oscillator 120 produces a modulating signal 125. First oscillator 120 may be implemented with an ultra low 555 timer, configured in a stable mode, producing signal 125 as a square pulses signal. The fundamental frequency and the duty cycle of first oscillator output signal 125 may be determined by external components. In an example implementation, the fundamental frequency and the duty cycle of first oscillator output signal 125 may be determined at least in part by the sensing capacitance utilized by the sensing circuit 110.

First oscillator 120 is preferably designed so that, regardless of the value provided by sensing circuit 110, first oscillator output signal 125 will be audible. This has the benefit that any sensing capacitor can be used in sensing circuit 110, because the design of first oscillator 120 guarantees that first oscillator output signal 125 will always remain audible throughout the sensor's range.

Second oscillator 140 may be a voltage-controlled oscillator (VCO). The control voltage of the VCO may be set to be signal 135, thereby producing a FM-modulated (Frequency-modulated) output signal 145. The maximum and minimum value of signal 135 defines the maximum and minimum frequency values of output signal 145 produced by the VCO, which also adhere to a required FM frequency deviation.

In an example implementation, the maximum and minimum value of the signal that is input to the second oscillator 140 may be set by scaling signal 125 by signal conditioning circuit 130. In an example implementation, signal conditioning circuit 130 comprises a resistor network. The scaled signal 135 is used as input to the second oscillator 140.

Temperature compensation 150 may be implemented. In an example implementation, the change in values of resistors in sensor apparatus 100 due to temperature variations can be compensated using thermistors. In an alternative, second example implementation, the behavior of sensor apparatus 100 with respect to temperature may be fully characterized and a correction on the measurement received by a reader may be applied. In yet another, third, example implementation, the first and second implementation may be combined.

Radio-frequency (RF) switch 160 is controlled by output signal 145 of Oscillator B. Its role is to switch the load connected to the antenna 170 between two values alternatively, with an alternation frequency control signal 145 stemming from Oscillator B. This device must be able to connect RF signals coming from the antenna 170 towards carefully selected loads.

In an example implementation, a commercial, below 1 µW power consumption device, such as Analog Devices ADG919 switch was utilized, operating at 1.2V, which was a value below its stated minimum operation voltage of 1.65V. The selected antenna loads were measured at 1.2V and antenna frequency of 90 MHz with magnitude of reflection coefficient difference of 1.7, which was close to the maximum difference of 2. In a second, example implementation, the switch 160 can be implemented with a BJT transistor, with potentially different power consumption. In a third, example implementation, a FET transistor can implement switch 160.

Antenna 170 is used to backscatter information, based on the switching operation of switch 160 driven by control signal 145. The device has no amplifier or signal generator at the FM frequencies. Instead the output signal 145 of Oscillator B, through the switching operation of the RF switch, changes alternatively the amplitude and phase of the illuminating signal (from an external source) arriving at the device antenna 170. The external source can be a modulated signal from a FM broadcasting station. The switching operation of the RF switch, controlled by Oscillator B output signal 145, effectively remodulates the incoming (illuminating) signal at the device antenna from the FM broadcasting station. The remodulated signal is backscattered with changed frequency, amplitude and phase, including information from both the illuminating FM station signal, as well as the device 100.

Although not shown in FIG. 1, backscatter sensor device 100 may be powered using energy harvesting methods (battery-less operation). For example, a photodiode may be used, such as the BPW34 photodiode.

In a second, implementation example, a solar panel may be used of limited size in the order of 31 mm×31 mm, with a voltage regulator, in order to avoid unnecessary frequency variations of signal 125. An alternative third, implementation example, could include a maximum power point tracking (MPPT) circuit after the solar panel, instead of the voltage regulator. Combinations of voltage regulation and MPPT circuits are possible.

Figure 6:
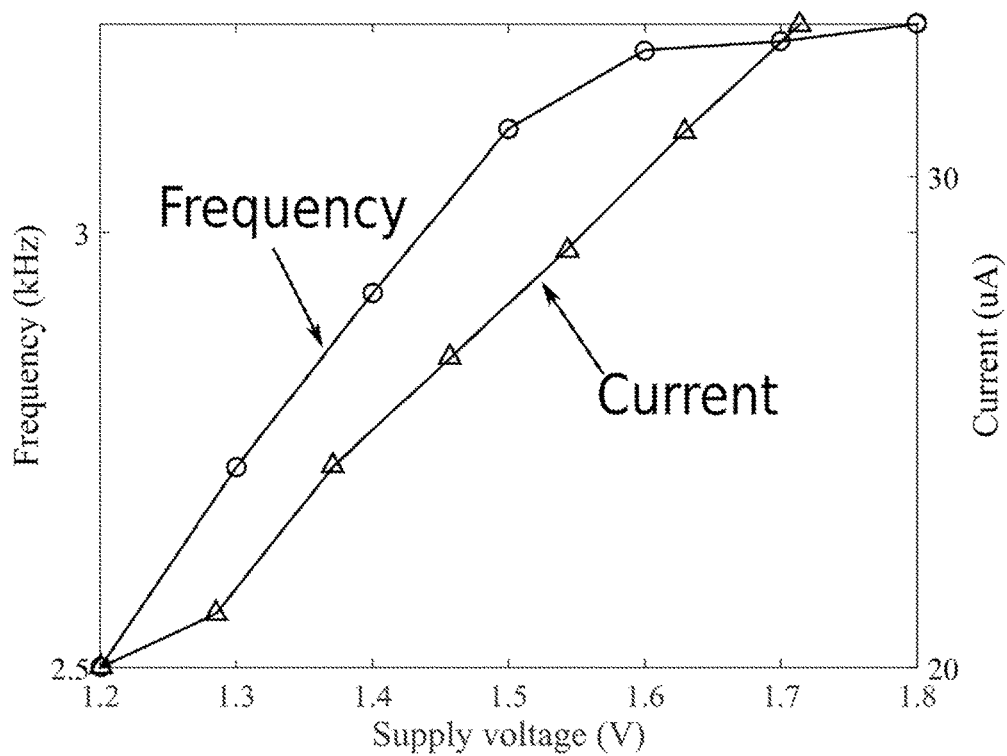
FIG. 6 offers measured total current consumption of the backscatter sensor device according to an aspect of the present invention.

The person skilled in the art will appreciate that any other appropriate energy harvesting method may be used. In yet another alternative implementation, power may be provided using electrochemical sources, such at two electrodes inserted into two lemons; the first electrode may be a zinc-plated nail and the second may be a thick copper wire. Similar electrodes and electrochemical methods can be also exploited, due to the ultra-low power consumption of the wireless device 100, measured at less than 20 µA at 1.2V, resulting to less than 24 µW of power consumption under continuous operation of device 100. FIG. 6 offers total current consumption of the overall device 100, as a function of supply voltage.

Consider the case of a RF wave produced by a source with impedance $Z_{source}$. The source is connected to a load, $Z_{load}$.

If the load is not matched with the source, i.e $Z_{source} \neq Z^*_{load}$, a portion of the power destined for the load will be reflected back to the source. The amount of reflection depends on the reflection coefficient, defined as:

$$\Gamma = \frac{Z_{load} - Z^*_{source}}{Z_{load} + Z_{source}}. \quad \text{(Eq. 1)}$$

The above can be exploited to achieve communication. If the RF source is an antenna and a load is chosen that offers reflection of the incident wave, the antenna is forced to reflect. On the other hand, if the load is matched to the antenna, ideally, the load absorbs all the power and no reflection occurs. By carefully choosing the loads and the alternation between them, we can manipulate the reflected signal to attain certain characteristics. The antenna 170 is terminated, alternatively, at two different loads $Z_0$, $Z_1$ (resulting to $\Gamma_0$, $\Gamma_1$, respectively), using a RF switch 160. The switch is driven by a square wave, s(t), with frequency $F_{sw}$ and 50% duty cycle. By keeping only the fundamental frequency component of s(t) (which holds ≈80% of s(t)'s power), the signal driving the switch can be expressed as: $x_{sw} = A_{sw} \cos(2\pi F_{sw} t)$, (Eq. 2) where in Eq. (2) a constant term related to the RF parameters of the system and the random phase in the cosine term have been ignored, for simplified exposition. If the antenna of the aforementioned setup is illuminated by a high frequency signal c(t), the signal backscattered from the antenna 170 is given by: $y(t) = \sqrt{\eta} c(t) x_{sw}(t) = \sqrt{\eta} c(t) A_{sw} \cos(2\pi F_{sw} t)$, (Eq. 3) where η, is the scattering efficiency, depending on the chosen loads and the antenna characteristics. It can be seen, from Eq. (3), that by alternating the termination of an antenna illuminated by c(t), we get modulation-operation of the low frequency $x_{sw}(t)$ signal, by the higher frequency illuminating c(t) signal.

Having described the basic principle of backscattering, we next detail the principle of FM remodulation. The signal model of any ϕ(t) that undergoes Frequency Modulation (FM), is given by [ProSal01]:

$$c_s(t) = A_s \cos\left(2\pi F_s t + 2\pi k_s \int_0^t \phi_s(\tau) d\tau\right), \quad \text{(Eq. 4)}$$

where $A_s$, $F_s$ is the carrier amplitude and center frequency, respectively of the illuminating signal and $k_s$ is the modulator's frequency sensitivity, measured in Hz/V. FM modulation index is given by $\beta_s = \Delta f_{max}/W = k_s \max|\phi_s(t)|/W$, where W is the (baseband) bandwidth of $\phi_s(t)$. If max $|\phi_s(t)|=1$, then $\Delta f_{max} = k_s$. Signal model in Eq. (4) applies to any FM radio station and thus, $\phi_s(t)$ includes an FM broadcasting station's audio information (mono or stereo) plus any additional digital information about the station (RD S), when RD S is also transmitted. If in Eq. (3), $x_{sw}(t)$ admits the following form:

$$x_{sw,FM}(t) = A_{sw}\cos\left(2\pi F_{sw} t + 2\pi k_{sw} \int_0^t \mu(\tau) d\tau\right), \quad \text{(Eq. 5)}$$

i.e., the RF switch is driven by a square wave with fundamental frequency modulated by μ(t) and the illuminating carrier is a modulated signal from a FM radio station (Eq. (4)), then the backscattered signal from the sensor device 100 is given by:

$$y_{bs}(t) = \sqrt{\eta}\, c_s(t) x_{sw,FM}(t) \quad \text{(Eq. 6)}$$

$$= \frac{\gamma_s}{2}\cos(2\pi(F_s + F_{sw})t + \Phi_s(t) + \Phi_{tag}(t)) + \quad \text{(Eq. 7)}$$

$$\frac{\gamma_s}{2}\cos(2\pi(F_s - F_{sw})t + \Phi_s(t) - \Phi_{tag}(t)),$$

where $$\gamma_s = \sqrt{\eta}\, A_s A_{sw},\ \Phi_s(t) = 2\pi k_s \int_0^t \phi_s(\tau) d\tau\ \text{and}\ \Phi_{tag}(t) = 2\pi k_{sw} \int_0^t \mu(\tau) d\tau.$$

Eq. (6) offers the sum of two FM signals, one at $F_s+F_{sw}$ and another at $F_s-F_{sw}$, since their instantaneous frequency depends on $\Phi_s(t)+\Phi_{tag}(t)$.

Thus, backscattering results to FM signaling when the illuminating signal is FM and the switching signal is also FM; such operation may be coined as FM remodulation. Notice that the FM signal at $F_s \pm F_{sw}$ is attenuated by $\sqrt{\eta}$, while it contains information from both the illuminating FM station (which transmits at central frequency $F_s$) and the sensor device 100. For the special case of $\Phi_s(t)$=constant, the above signal model is simplified to the bistatic scatter radio case, where the illuminating signal is an unmodulated carrier (as in e.g., [Bletsas et 12b]).

The FM remodulation principle observed above means that any conventional FM radio receiver, tuned at either of $F_s \pm F_{sw}$, can demodulate the backscattered signal, as long as the following conditions hold:

1. μ(t) bandwidth is limited to the audible spectrum (20 Hz to 20 kHz) or up to the maximum frequency of 53 kHz (assuming stereo FM reception) or slightly above (including the band for RDS information).

2. At least one of $F_s \pm F_{sw}$ falls within the FM radio frequency band (88 MHz to 108 MHz), 3. Audio level of the backscattered demodulated tag signal is above a required threshold for successful FM reception. Note that ϕ(t) acts as interference in the reception of μ(t).

Sensor's μ(t) is limited in the audible spectrum, potentially amenable to FM station's interference, while $k_{sw} \neq k_s$. To reduce interference from the FM station signal on the tag backscattered signal, the frequency band of μ(t) may be placed on areas that are not occupied by frequency components of ϕ(t). For example, if the chosen FM radio station has only voice content, α(t) can be designed to occupy a higher frequency band. Additionally, experiments have shown that by increasing the frequency deviation of the switching signal (up to a certain value, so that the FM threshold phenomenon does not kick in), higher audio levels of μ(t) are offered compared to interference. Such method does not eliminate interference but reduces its effect, allowing for successful sensor interrogation. An alternative solution would be to demodulate and recover in parallel ϕ(t), using a SDR receiver or a second FM receiver and then perform interference cancellation. Reception of sensor 100 backscattered information is restricted to a single handheld smartphone with a single FM receiver.

One of the beauties of backscatter radio is the fact that modulation is facilitated at passband and not at baseband, as in conventional Marconi radios; thus, sensor 100 switching 160 according to Eq. (5) offers remodulated backscattered signal at $\{F_s \pm F_{sw}\}$, for all FM stations $s \in \{1, 2, \ldots L\}$. For L FM stations, there are 2L possible passband frequencies for the smartphone FM receiver to select from. Selecting the FM station with the strongest received power, could increase the value of $\gamma_s$ in Eq. (7), which is important, given that backscatter communications are link-budget-limited (i.e., noise limited) and higher carrier amplitude in FM modulation results to smaller impact of thermal noise.

Figure 2:
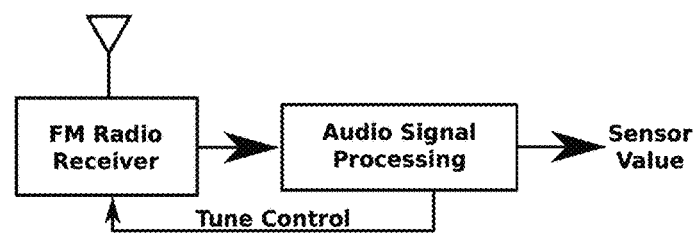
FIG. 2 is a system view of a receiver of the backscattered sensor signal according to an aspect of the present invention.
Figure 3:
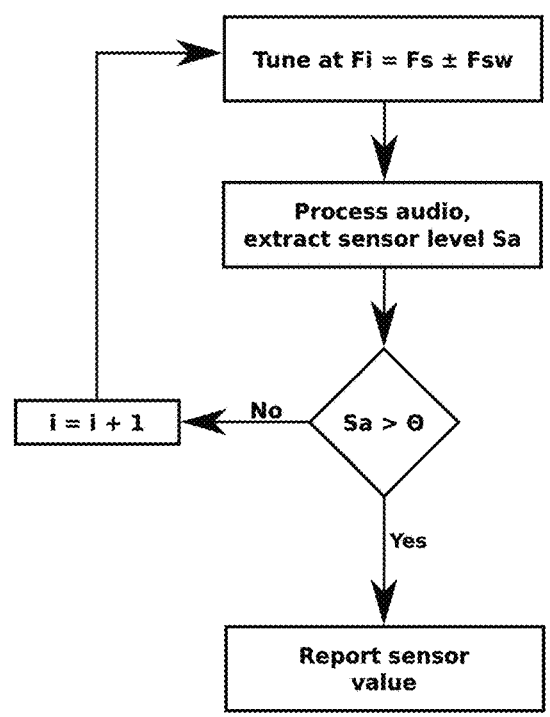
FIG. 3 is a receiver device method for boosting the communication range of a device of FIG. 1.

However, the above selection process is not sufficient. The above assume that there is no other interfering signal (e.g., from another FM station) at frequencies around $F_s \pm F_{sw}$. Additionally, the above selection does not necessarily minimize the interference from each FM station's own $\phi_s(t)$ signal on the tag's signal $\mu(t)$. Thus, an alternative is to select FM station s*, where the demodulated sensor's audio signal level is maximized That can be easily and directly implemented with a single smartphone FM receiver, tunning at 2L frequencies $F_s \pm F_{sw}$, $s \in \{1, 2, \ldots L\}$ for given $F_{sw}$ and selecting s=s*, where the sensor's (demodulated) signal tone power is above a user-defined threshold $\Theta$. A value of $\Theta$ which is 10 dB above noise (thermal and interference) floor may be utilized. Selecting the appropriate frequency $F_i = F_{s*} \pm F_{sw}$, where the smartphone receiver should tune at (among 2L candidates $\{F_s \pm F_{sw}\}$, $s \in \{1, 2, \ldots L\}$), so that receiver output level at sensor's expected audio band is maximized, is depicted in FIG. 3, which is the internal operation of the FM receiver, depicted in FIG. 2.

One way for simultaneous operation of multiple, continuous backscattering sensors may be to allocate the audible spectrum with non-overlapping frequency bands among the various sensors, by carefully tuning the circuit producing $\mu(t)$. A second more efficient way may be to allocate, distinct central switching frequencies $F_{sw}$ and frequency bands around, uniquely among the sensors. Both ways above, essentially offer frequency division multiple access (FDMA), the first using the audible spectrum and the second using FM passband (from 88 MHz to 108 MHz). FDMA techniques have been already demonstrated experimentally in scatter radio networking (e.g., in [Bletsas et al 13b]). A third way may be to combine the above and a fourth way is combining time and frequency division multiple access techniques.

Any conventional FM radio receiver can be used, provided that $\mu(t)$ is audible. A large number of smartphones or consumer electronics is equipped with FM radio. Exploiting selection diversity and tunning at the FM station that offers the strongest demodulated tags's tone, the sensor's value can be extracted by frequency estimation of the tag's received audible tone; frequency estimation can be conducted with maximum likelihood (ML) techniques on the audio samples, using periodograms.

Figure 4:
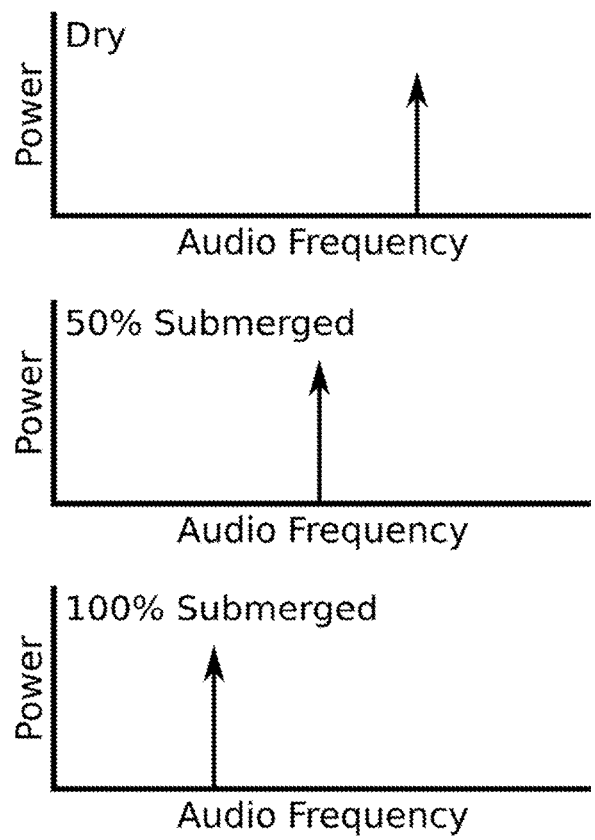
FIG. 4 offers audio spectrum of the received signal at a smartphone screen, depicting sensor information according to an aspect of the present invention.

In an example implementation, FIG. 4 shows screen captures of an audio spectrum application running on a Motorola Moto G3, while the soil moisture sensor is being gradually submerged into a glass of water. The experiment was conducted indoors, with tag voltage supply at 1.2 V and tag-smartphone distance of 1 m. Clearly, the water level can be detected.

Figure 5:
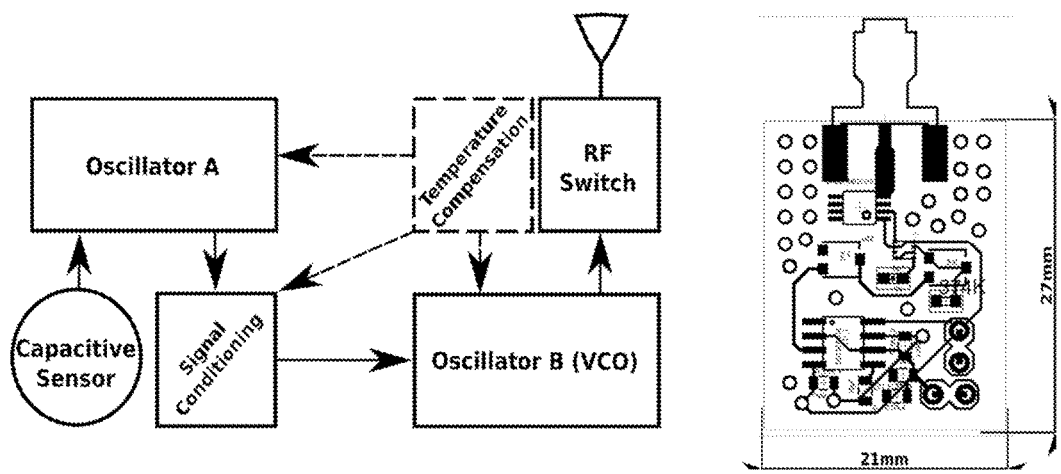
FIG. 5 shows the designed and implemented printed circuit board (PCB) according to an aspect of the present invention.

In an example implementation, FIG. 5 shows the designed and manufactured printed circuit board (PCB) of the wireless sensor device 100.

Figure 7:
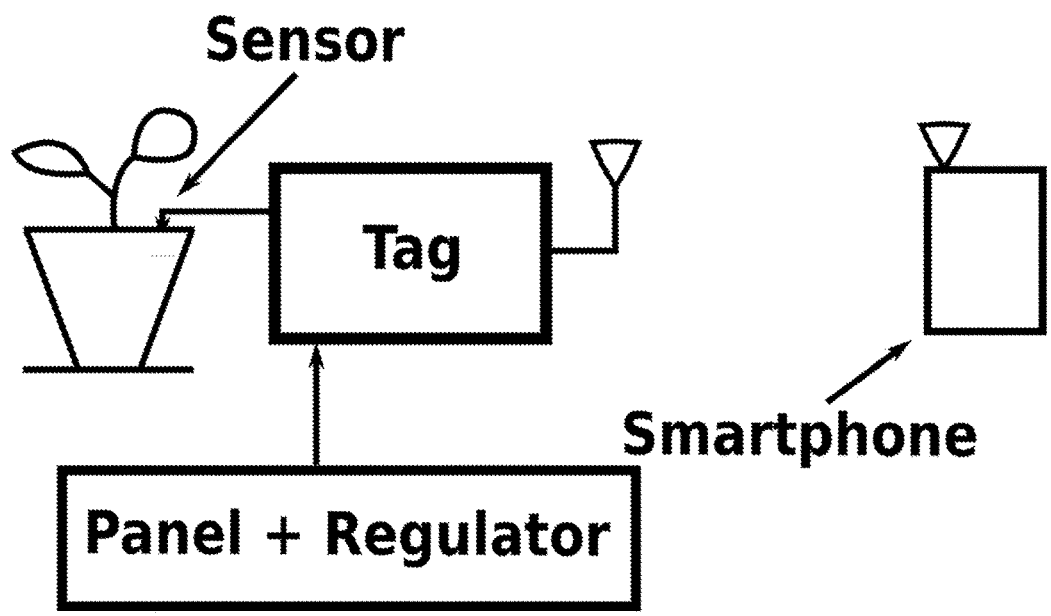
FIG. 7 shows both receiving smartphone and sensor device with various powering modes, according to aspects of the present invention.

In an example implementation, FIG. 7 shows both receiving smartphone and sensor device with various powering modes.

If a computer (e.g., embedded microprocessor) is needed to read the sensor, two options are offered. First, any conventional FM radio receiver can be connected to the computer's audio in/microphone input. Alternatively, a software-defined radio (SDR) receiver, such as RTL, can be tuned at the FM band and offer the downconverted signal audio samples for processing. The computer processes the audio samples and extracts sensor's value, as described above. Second, a dedicated carrier, other than the ambient FM signals, can illuminate the tag. The tag is indifferent with respect to the carrier used. A computer equipped with a SDR receiver can perform FM demodulation and recover the sensor's value. To verify the last statement, experiments have been performed under illumination from a carrier on $F_c$=868 MHz. The receiver used was a low cost RTL dongle and the FM demodulation/sensor readout was performed in GNU radio. The only additional requirement of this technique is that tag's antenna should be able to receive both at the FM as well as the UHF band.

Figure 8:
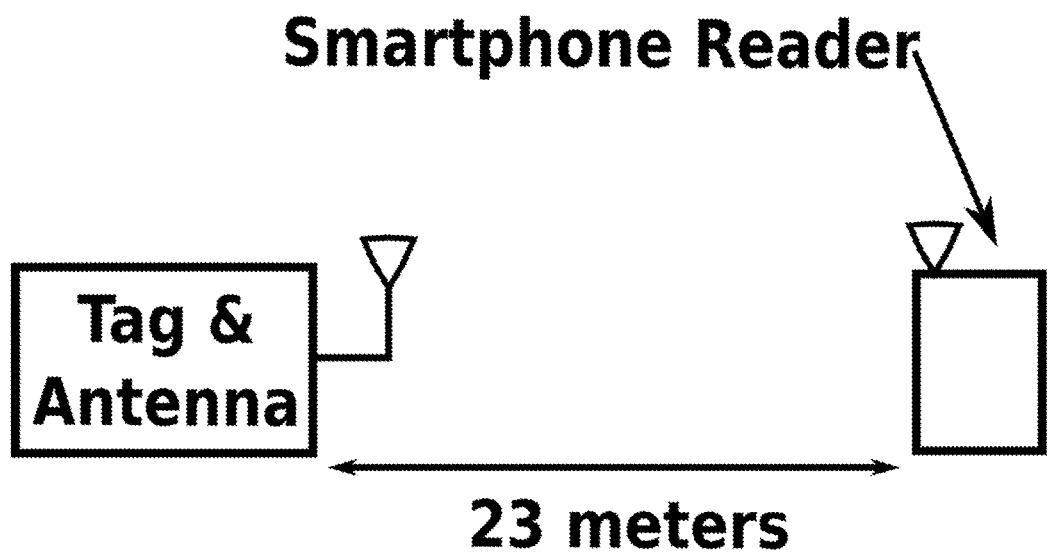
FIG. 8 offers the outdoor setup for sensor device-receiver range measurements, according to aspects of the present invention.

Range performance of the tag-smartphone system may be tested in indoor and outdoor scenarios. The strength of the demodulated audio signal is reported, exploiting the Advanced Spectrum Analyzer PRO application, running at the smartphone. This application reports audio level in a scale of dbFS, which measures the audio level with respect to Full Scale audio input. Anything above −20 dbFS is almost unbearable (using earphones) and anything below −70 dbFS is noise. During the tests, a standard-value capacitor was utilized as the sensing capacitor, offering a fixed 1st modulation level signal at frequency of 3.2 kHz. That was done to ease the process of acquiring measurements by ensuring a constant "sensor value" to be estimated at the smartphone/reader. It must be noted that, by choosing another signal frequency, different performance results will be obtained. For the same reason, the tests were conducted using a 1.5 V AA battery. The measurements reported audio level at 3.2 kHz, using the smartphone application's markers. The power of FM stations' received signal at the location of the tag was measured with a spectrum analyzer. The outdoor setup can be seen in FIG. 8 and results are offered for 2 FM stations in FIG. 9; it can be seen that the tag achieves at least 23 meters before the audio tone power drops below −60 dbFS, i.e., 10 dB above noise, resulting to demodulated backscattered signal SNR of 10 dB. The performance was tested for two different FM stations, offering different RF power levels; for each FM station, the test was repeated twice (Experiment 1 and 2) to showcase the slight variation in the measurements, due to wireless fading in the end-2-end link from FM station-to tag-to smartphone.

Figure 10:
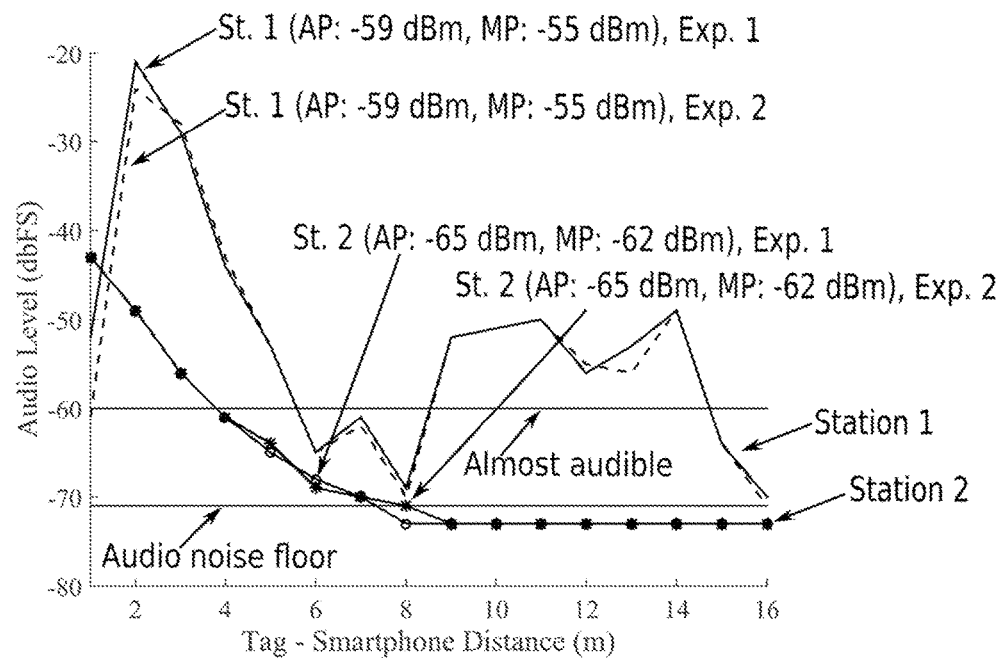
FIG. 10 offers indoor range measurement results, according to an aspect of the present invention.

Results for the indoor scenario are shown in FIG. 10. The tests were conducted in one hallway. The awkward behavior of FM station's 1 curves can be explained by the presence of large metallic objects in the 6-8 meters range. It can be seen that a station offering higher impinged RF power results to drastically better performance, experimentally demonstrating the importance of ambient selection diversity (across various ambient illuminators). In both experiments, different FM stations were used.

Figure 9:
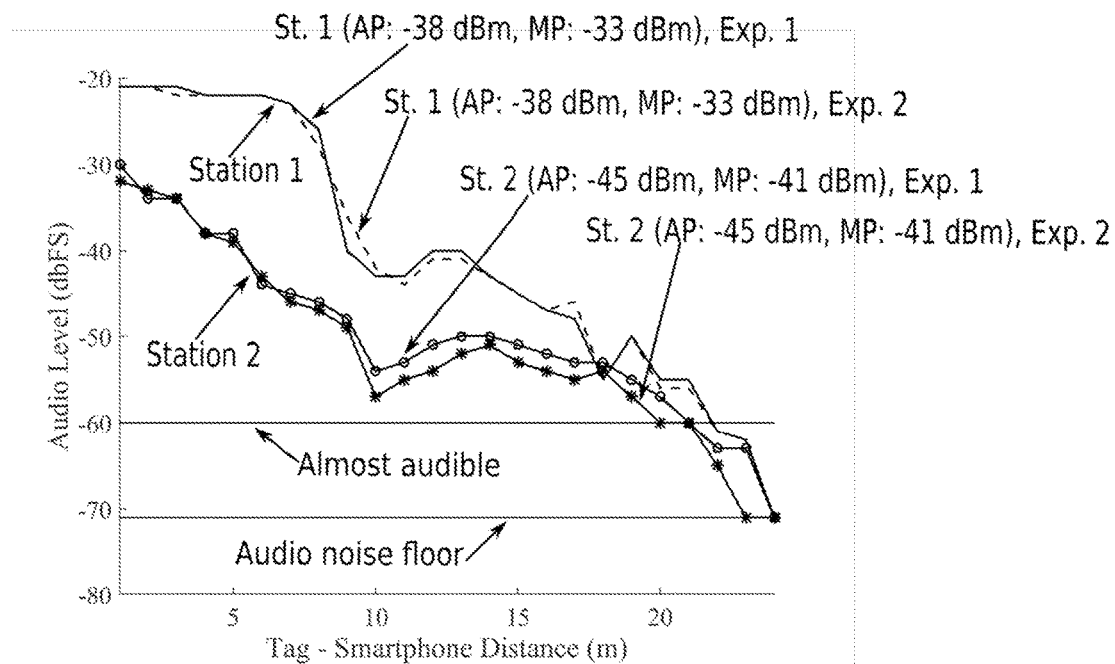
FIG. 9 offers range measurement results with two broadcasting stations and the outdoor setup of FIG. 8.
Figure 11:
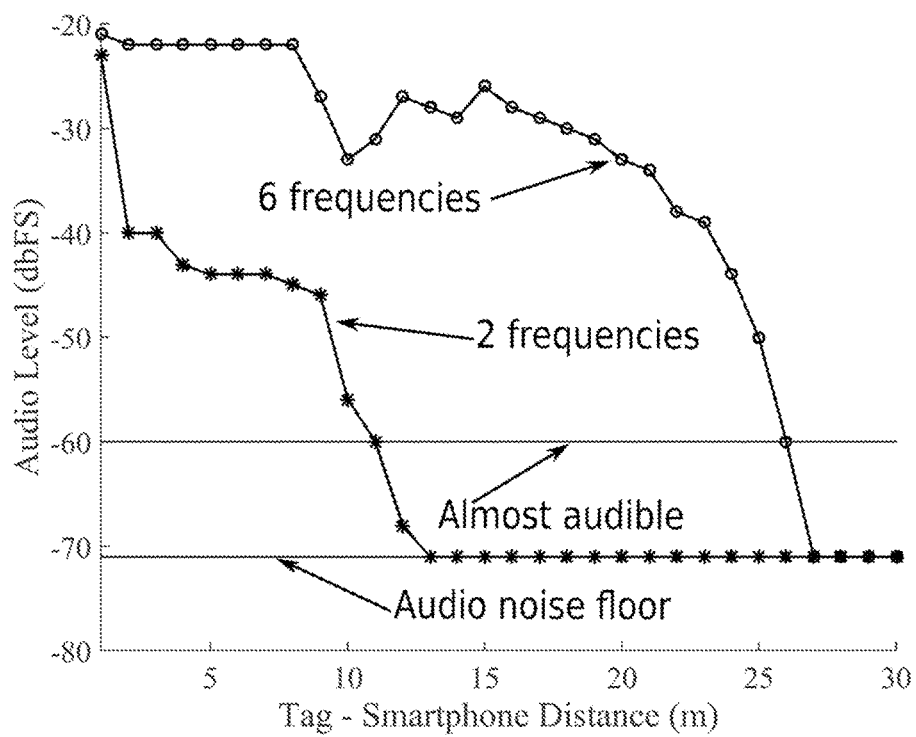
FIG. 11 offers range measurement results with three broadcasting stations and the outdoor setup of FIG. 8.

Finally, FIG. 11 repeats the same experiment as in FIG. 9 outdoors, where the smartphone selects the maximum demodulated audio sensor's output signal power among L=3 FM stations (i.e., the smartphone tunes at 2L=6 frequencies and the strongest measurement is reported). The results show significant reception improvement, offering range up to 26 m. When selection is performed among two fixed frequencies, performance is weaker, highlighting again the importance of selection diversity; the latter comes for free for backscatter radio.

This invention presented a batteryless backscatter sensor device, able to be (literally) listened by any conventional FM radio receiver, including modern smartphones. Using a dedicated carrier emitter, in a bistatic topology is also possible, in conjunction with a computer and a SDR receiver. Experimental results showed that, under ambient FM illumination, the sensor's value can be read even at distances of 16 and 26 meters for indoor and outdoor scenarios, respectively. The whole circuit consumption was measured at 24 µW with continuous (non duty-cycled) operation. The design can accommodate various resistive or capacitive sensing elements. Benefits of selection diversity can be also harvested, exploiting an inherent characteristic of scatter radio: modulation occurs at passband and thus, the tag signal simultaneously travels on several carriers.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

REFERENCES

[Bletsas et al 08] G. Vannucci, A. Bletsas, and D. Leigh, "A software-defined radio system for backscatter sensor networks," IEEE Trans. Wireless Commun., vol. 7, no. 6, pp. 2170-2179, June 2008.

[Bletsas et al 12] A. Bletsas, J. Kimionis, A. G. Dimitriou, and G. N. Karystinos, "Single-antenna coherent detection of collided FM0 RFID signals," IEEE Trans. Commun., vol. 60, no. 3, pp. 756-766, 2012.

[Bletsas at al 12b] J. Kimionis, A. Bletsas, and J. N. Sahalos, "Design and implementation of RFID systems with software defined radio," in Proc. IEEE European Conf. on Antennas and Propagation (EuCAP), Prague, Czech Republic, Mar. 2012, pp. 3464-3468.

[Bletsas et al 14] J. Kimionis, A. Bletsas, and J. N. Sahalos, "Increased range bistatic scatter radio," IEEE Trans. Commun., vol. 62, no. 3, pp. 1091-1104, March 2014.

[Smith et al 13] V. Liu, A. Parks, V. Talla, S. Gollakota, D. Wetherall, and J. R. Smith, "Ambient backscatter: Wireless communication out of thin air," in ACM SIGCOMM, Hong Kong, China, 2013, pp. 39-50.

[Smith et al 17] A. Wang, V. Iyer, V. Talla, J. R. Smith, and S. Gollakota, "FM backscatter: Enabling connected cities and smart fabrics," in USENIX Symposium on Networked Systems Design and Implementation, Boston, Mass., USA, March 2017.

[Bletsas et al 13] C. Konstantopoulos, E. Kampianakis, E. Koutroulis, and A. Bletsas, "Wireless sensor node for backscattering electrical signals generated by plants," in Proc. IEEE Sensors Conf., Baltimore, Md., USA, November 2013.

[Bletsas et al 13b] E. Kampianakis, J Kimionis, K. Tountas, C. Konstantopoulos, E. Koutroulis, and A. Bletsas, "Backscatter sensor network for extended ranges and low cost with frequency modulators: Application on wireless humidity sensing," in Proc. IEEE Sensors Conf., Baltimore, Md., USA, November 2013.

[Bletsas 14b] S. N. Daskalakis, S. D. Assimonis, E. Kampianakis, and A. Bletsas, "Soil moisture wireless sensing with analog scatter radio, low power, ultra low cost and extended communication ranges," in Proc. IEEE Sensors Conf., Valencia, Spain, November 2014, pp. 122-125.

[ProSal01] J. G. Proakis and M. Salehi, Communication Systems Engineering, 2nd ed. Upper Saddle River, N.J., USA: PrenticeHall, 2001.

The invention claimed is:

1. A device comprising:
   an antenna configured to receive and backscatter a RF signal;
   a sensing element;
   a base (first) oscillator coupled to the sensing element;
   a modulation (second) oscillator configured to be controlled by the base oscillator;
   and an impedance modulator coupled to the antenna and controlled by the modulation oscillator.

2. The device of claim 1 wherein a fundamental frequency of the signal of the base oscillator is controlled by the sensing element.

3. The device of claim 1 wherein a frequency spectrum of the signal of the base oscillator is limited within a spectrum of audio frequencies.

4. The device of claim 1 wherein the sensing element is resistive, capacitive, inductive or combinations thereof.

5. The device of claim 1 wherein the instantaneous frequency of the signal of the modulation oscillator is controlled by the signal of the base oscillator and a signal conditioning network.

6. The device of claim 5 wherein the signal conditioning network includes resistors, capacitors or combinations thereof.

7. The device of claim 1 wherein the impedance modulator is a RF switch.

8. The device of claim 1 wherein the RF signal comes from FM radio stations or dedicated RF signal sources.

9. A method for recovering the value of the sensing element of the device of claim 1 using a receiver of RF signals having carrier frequencies within the range of frequencies of RF signals of claim 8.

10. The method of claim 9 wherein the receiver includes a FM demodulation device tunable to a range of carrier frequencies and providing an output demodulated signal.

11. The method of claim 10 wherein the demodulated signal has a frequency spectrum covering at least the frequency spectrum of the signal of the base oscillator of the device of claim 1.

12. The method of claim 10 wherein the receiver tunes sequentially to distinct carrier frequencies within its tunable range.

13. The method of claim 12 wherein for each distinct carrier frequency the receiver calculates the power of part of the demodulated signal.

14. The method of claim 13 wherein the part of the demodulated signal has frequency spectrum centered at the frequency spectrum center of the signal of the base oscillator of the device of claim 1.

15. The method of claim 13 wherein the receiver selects a carrier frequency offering a power above a predefined threshold.

* * * * *